United States Patent
Lee et al.

(10) Patent No.: US 7,889,183 B2
(45) Date of Patent: Feb. 15, 2011

(54) LIQUID CRYSTAL DISPLAY INCLUDING SENSING UNIT AND IMAGE DATA LINE ARRANGEMENT

(75) Inventors: Myung-Woo Lee, Seoul (KR); Joo-Hyung Lee, Gyeonggi-do (KR); Sang-Jin Pak, Yongin-si (KR); Kee-Han Uh, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 838 days.

(21) Appl. No.: 11/512,546

(22) Filed: Aug. 29, 2006

(65) Prior Publication Data

US 2007/0046650 A1    Mar. 1, 2007

(30) Foreign Application Priority Data

Aug. 29, 2005    (KR) .................. 10-2005-0079413

(51) Int. Cl.
G09G 5/00    (2006.01)

(52) U.S. Cl. .................. 345/173; 345/174; 345/175; 349/24; 349/41; 349/42; 349/12; 349/23

(58) Field of Classification Search ......... 345/173–178, 345/100, 104, 207; 178/18.03–20.04
See application file for complete search history.

(56) References Cited

U.S. PATENT DOCUMENTS

| | | | |
|---|---|---|---|
| 3,795,828 A * | 3/1974 | Cavaliere et al. ............ 327/565 |
| 6,525,710 B1 * | 2/2003 | Kwon ......................... 345/100 |
| 6,947,102 B2 * | 9/2005 | den Boer et al. .............. 349/12 |
| 7,280,102 B2 * | 10/2007 | Abileah et al. .............. 345/204 |
| 7,420,608 B2 * | 9/2008 | Yamasaki ............... 348/333.01 |
| 7,483,005 B2 * | 1/2009 | Nakamura et al. ............ 345/87 |

2004/0046900 A1    3/2004    Boer et al.

FOREIGN PATENT DOCUMENTS

| | | |
|---|---|---|
| JP | 2000-99268 | 4/2000 |
| JP | 2001-42296 | 2/2001 |
| JP | 2003-66417 | 3/2003 |
| JP | 2003-195783 | 7/2003 |
| KR | 2003-0028973 | 4/2003 |
| KR | 2004-095941 | 11/2004 |

(Continued)

OTHER PUBLICATIONS

Patent Abstracts of Japan, Publication No. 2000-099268, Apr. 7, 2000, 1 p.

(Continued)

*Primary Examiner*—Bipin Shalwala
*Assistant Examiner*—Kelly Hegarty
(74) *Attorney, Agent, or Firm*—Innovation Counsel LLP

(57) ABSTRACT

The present invention is related to a liquid crystal display. The liquid crystal display includes a display panel, a plurality of pixels formed on the display panel, a sensing unit disposed among the pixels and generating a sensor data signal based on a touch to the display panel, a plurality of image data lines connected to the pixels and transmitting image data signals, and a sensor data line connected to the sensing unit and transmitting the sensor data signal. The sensor data line is separated from an image data line adjacent thereto with respect to the pixel.

22 Claims, 12 Drawing Sheets

FOREIGN PATENT DOCUMENTS

| | | |
|---|---|---|
| KR | 2005-038987 | 4/2005 |
| KR | 2005-043320 | 5/2005 |
| KR | 2005-051366 | 6/2005 |

OTHER PUBLICATIONS

Patent Abstracts of Japan, Publication No. 2001-042296, Feb. 16, 2001, 1 p.

Patent Abstracts of Japan, Publication No. 2003-66417, Jul. 9, 2003, 1 p.

Patent Abstracts of Japan, Publication No. 2003-195783, Jul. 9, 2003, 1 p.

Korean Patent Abstracts, Publication No. 1020030028973, Apr. 11, 2003, 1 p.

Korean Patent Abstracts, Publication No. 1020040095941, Nov. 16, 2004, 1 p.

Korean Patent Abstracts, Publication No. 1020050038987, Apr. 29, 2005, 1 p.

Korean Patent Abstracts, Publication No. 1020050043320, May 11, 2005, 1 p.

Korean Patent Abstracts, Publication No. 1020050051366, Jun. 1, 2005, 1 p.

* cited by examiner

US 7,889,183 B2

LIQUID CRYSTAL DISPLAY INCLUDING SENSING UNIT AND IMAGE DATA LINE ARRANGEMENT

CROSS-REFERENCE TO RELATED APPLICATION

The present application claims priority from Korean Patent Application No. 2005-0079413, filed on Aug. 29, 2005, the disclosure of which is hereby incorporated herein by reference.

FIELD OF THE INVENTION

The present invention relates to a liquid crystal display.

DESCRIPTION OF RELATED ART

Liquid crystal displays (LCDs) include a pair of panels provided with pixel electrodes and a common electrode, and a liquid crystal layer with dielectric anisotropy interposed between the panels. The pixel electrodes are arranged in a matrix and connected to switching elements such as thin film transistors (TFTs) which receive image data voltages row by row. The common electrode covers the entire surface of one of the two panels, and is supplied with a common voltage. A pixel electrode and corresponding portions of the common electrode, and corresponding portions of the liquid crystal layer, form a liquid crystal capacitor that, along with the switching element connected thereto, comprise the basic pixel element.

The voltages applied between the pixel electrodes and the common electrode display images by controlling the transmittance of light through the liquid crystal layer.

Touch screen panels display letters or pictures by touching a finger, touch pen, or a stylus to a display panel, or carry out desired operations of machines such as computers, etc., by operating icons. LCDs attached to the touch screen panels determine whether and where a touch occurs to the display panel. However, the manufacturing cost of the LCD increases due the attached touch screen panel. Furthermore, due to the addition of a process for attaching the touch screen panel to the LCD, the yield and the luminance decrease and the thickness of the LCD increases.

SUMMARY OF THE INVENTION

In accordance with the preset invention, a touch screen LCD panel includes a sensing unit sensing variation in pressure. The sensor data line connected to the sensing unit and generating a sensor data signal based on touching the display panel is located between adjacent pixels and is separated from the adjacent image data line. The sensing unit includes a sensing element sensing variation of light that is incident from the outside in accordance with the touch to generate the sensor data signal and which outputs the sensor data signal to the sensor data line. A light blocking member formed under the first and second image data lines and on the sensor data line may be formed at the same layer as the pixel electrodes.

BRIEF DESCRIPTION OF THE DRAWINGS

The present invention will become more apparent by describing preferred embodiments with reference to the accompanying drawings, in which.

DETAILED DESCRIPTION OF EMBODIMENTS

Figure 1:
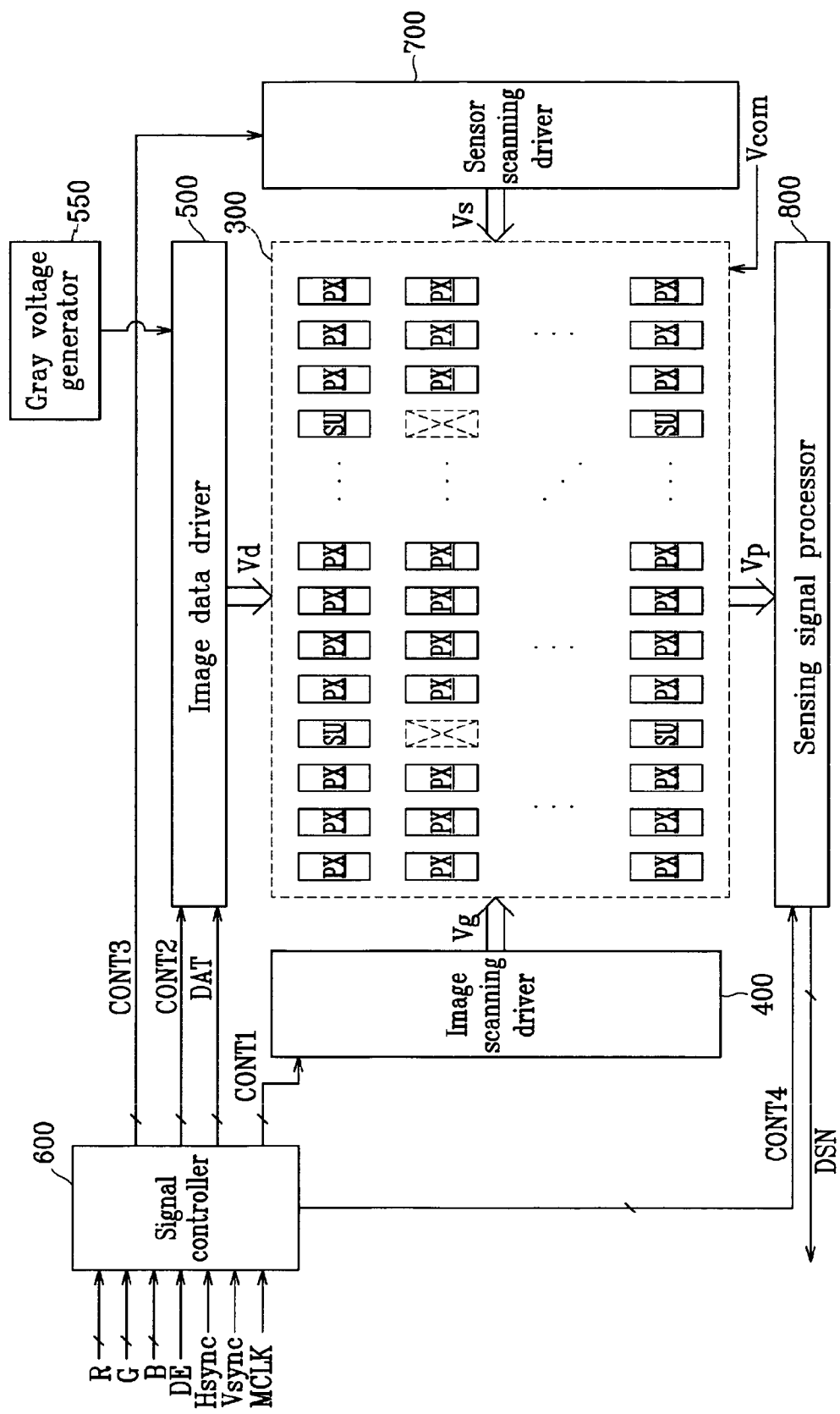
FIG. 1 is a block diagram of an LCD including a plurality of pixels and a plurality of sensing units according to an embodiment of the present invention.

In the drawings, the thickness of layers and regions are exaggerated for clarity. Like numerals refer to like elements throughout. It will be understood that when an element such as a layer, film, region, substrate, or panel is referred to as being "on" another element, it can be directly on the other element or intervening elements may also be present. In contrast, when an element is referred to as being "directly on" another element, there are no intervening elements present.

Figure 2:
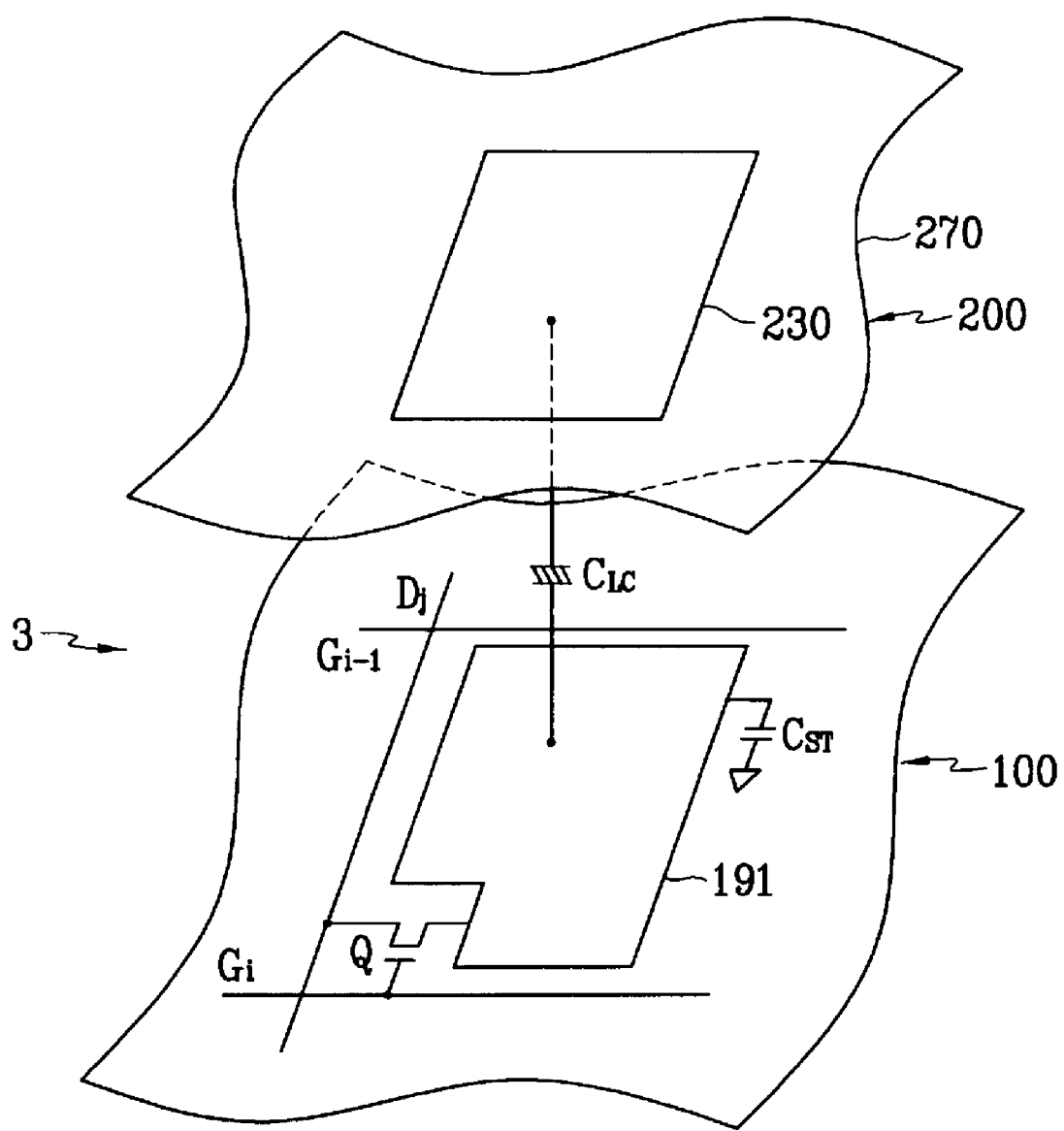
FIG. 2 is an equivalent circuit diagram of a pixel of an LCD according to an embodiment of the present invention.
Figure 3A:
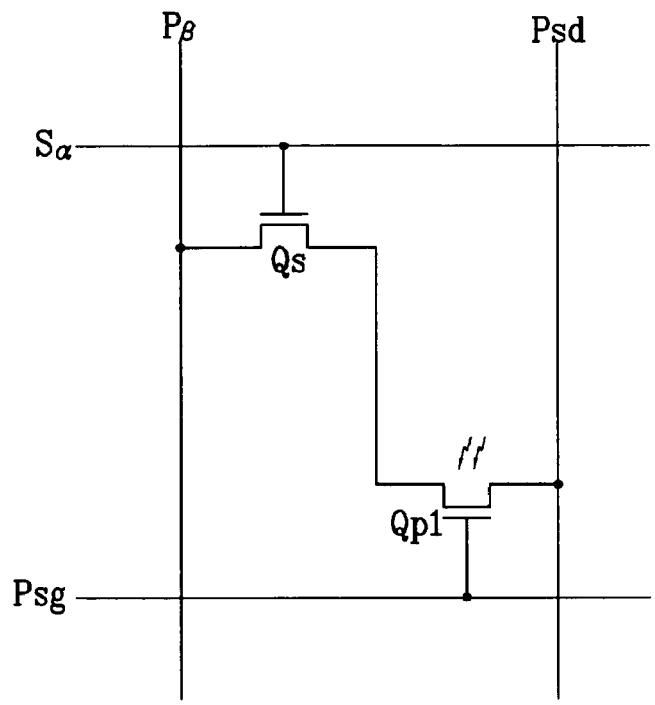
FIGS. 3A and 3B are equivalent circuit diagrams of sensing units of an LCD according to an embodiment of the present invention, respectively.
Figure 3B:
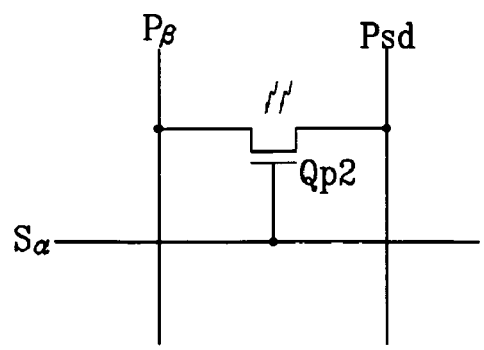
Figure 4:
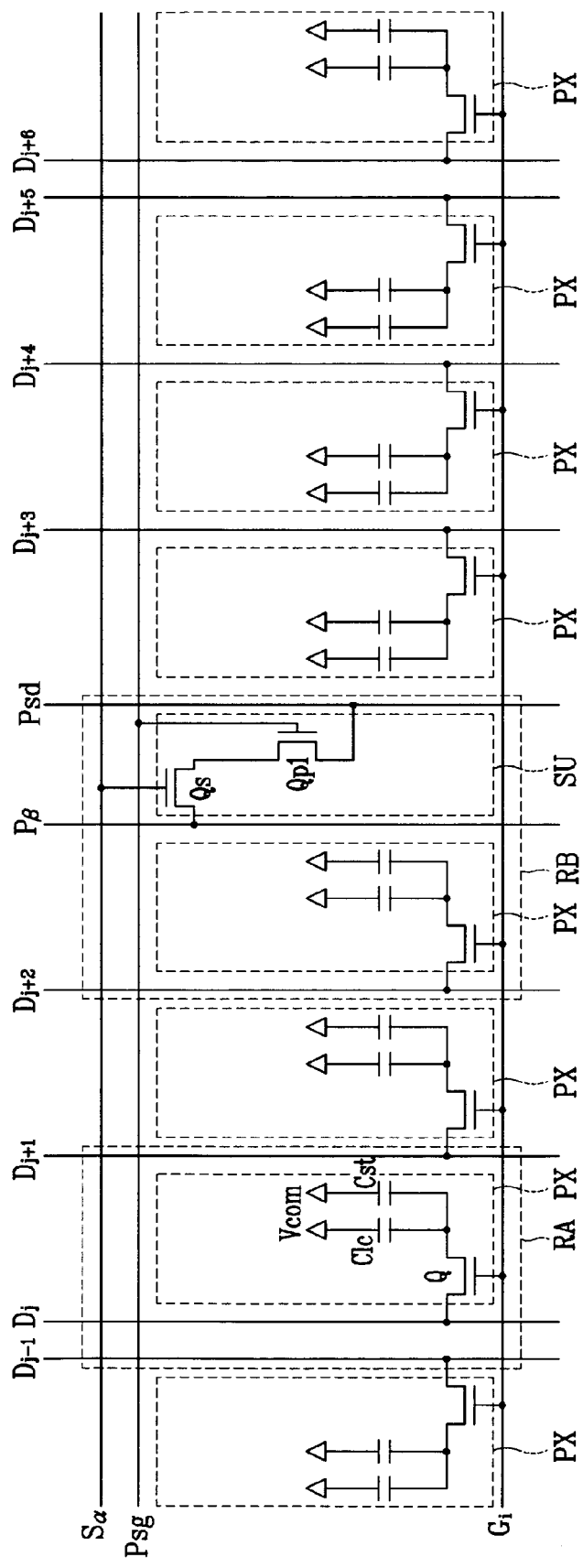
FIG. 4 illustrates an arrangement of pixels and sensing units of an LCD according to an embodiment of the present invention.

LCDs according to an embodiment of the present invention will now be described with reference to FIGS. 1 to 4. FIG. 1 is a block diagram of an LCD including a plurality of pixels and a plurality of sensing units according to an embodiment of the present invention, FIG. 2 is an equivalent circuit diagram of a pixel of an LCD according to an embodiment of the present invention, FIGS. 3A and 3B are equivalent circuit diagrams of sensing units of an LCD according to an embodiment of the present invention, respectively, and FIG. 4 illustrates an arrangement of pixels and sensing units of an LCD according to an embodiment of the present invention.

Referring to FIG. 1, an LCD according to an embodiment includes a liquid crystal (LC) panel assembly 300, an image scanning driver 400, an image data driver 500, a sensor scanning driver 700, and a sensing signal processor 800 that are coupled with the panel assembly 300, a gray voltage generator 550 coupled with image data driver 500, and a signal controller 600 for controlling the above elements.

Referring to FIGS. 1-3B, the panel assembly 300 includes a plurality of display signal lines $G_i$ and $D_j$ (i and j are natural numbers), a plurality of sensor signal lines $S_\alpha$, $P_\beta$, Psg, and Psd, a plurality of pixels PX connected to the display signal lines $G_i$ and $D_j$ and arranged substantially in a matrix, and a plurality of sensing units SU connected to sensor signal lines $S_\alpha$, $P_\beta$, Psg, and Psd, and arranged substantially in a matrix. In a structural view shown in FIG. 2, the panel assembly 300 includes a thin film transistor (TFT) array panel 100 and a common electrode panel 200 facing each other, and a liquid crystal (LC) layer 3 interposed therebetween.

The display signal lines $G_i$ and $D_j$ include a plurality of image scanning lines $G_i$ for transmitting image scanning signals Vg and a plurality of image data lines $D_j$ for transmitting image data signals Vd. Sensor signal lines $S_\alpha$, $P_\beta$, Psg, and Psd include a plurality of sensor scanning lines $S_\alpha$ for transmitting sensor scanning signals Vs, a plurality of sensor data lines $P_\beta$ for transmitting sensor data signals Vp, a plurality of control voltage lines Psg for transmitting a sensor control voltage, and a plurality of input voltage lines Psd for transmitting a sensor input voltage.

Image scanning lines $G_i$, sensor scanning lines $S_\alpha$, and control voltage lines Psg extend substantially in a row direction and are substantially parallel to each other, while image data lines $D_j$, sensor data lines $P_\beta$, and the input voltage lines Psd extend substantially in a column direction and are substantially parallel to each other.

Referring to FIG. 2, each pixel PX includes a switching element Q connected to signal lines $G_i$ and $D_j$, and an LC capacitor $C_{LC}$ and a storage capacitor $C_{ST}$ that are connected to switching element Q. Storage capacitor $C_{ST}$ may be omitted if it is unnecessary. Switching element Q such as a TFT is provided on the TFT array panel 100 and has three terminals: a control terminal connected to one of image scanning lines $G_i$; an input terminal connected to one of image data lines $D_j$; and an output terminal connected to the LC capacitor $C_{LC}$ and storage capacitor $C_{ST}$.

The liquid crystal capacitor $C_{LC}$ includes a pixel electrode 191 provided on the TFT array panel 100 and a common electrode 270 provided on the common electrode panel 200, as two terminals. The LC layer 3 disposed between the two electrodes 191 and 270 functions as the LC capacitor dielectric. Pixel electrode 191 is connected to switching element Q, and the common electrode 270 is supplied with a common voltage Vcom and covers an entire surface of the common electrode panel 200. Unlike in FIG. 2, the common electrode 270 may be provided on the TFT array panel 100, and both electrodes 191 and 270 may have shapes of bars or stripes.

Storage capacitor $C_{ST}$ is an auxiliary capacitor for the LC capacitor $C_{LC}$. Storage capacitor $C_{ST}$ includes pixel electrode 191 and a separate signal line (not shown), which is provided on the TFT array panel 100, overlaps pixel electrode 191 via an insulator, and is supplied with a predetermined voltage such as the common voltage Vcom. Alternatively, storage capacitor $C_{ST}$ includes pixel electrode 191 and an adjacent image scanning line called a previous image scanning line, which overlaps pixel electrode 191 via an insulator.

For color display, each pixel uniquely represents one of the primary colors (i.e., spatial division) or each pixel sequentially represents the primary colors in turn (i.e., temporal division) such that a spatial or temporal sum of the primary colors is recognized as a desired color. An example of a set of the primary colors includes red, green, and blue colors. FIG. 2 shows an example of the spatial division in which each pixel includes a color filter 230 representing one of the primary colors in an area of the TFT array panel 200 facing pixel electrode 190. Alternatively, color filter 230 is provided on or under pixel electrode 190 on the TFT array panel 100.

One or more polarizers (not shown) are attached to at least one of the panels 100 and 200. Each of sensing units SU may have one of the structures shown in FIGS. 3A and 3B. Each of sensing units SU1 having structure shown in FIG. 3A includes a sensing element Qp1 connected to a control voltage line Psg, and an input voltage line Psd and a switching element Qs connected to sensing element Qp1, a sensor scanning line $S_\alpha$, and a sensor data line $P_\beta$.

Sensing element Qp1 has three terminals, i.e., a control terminal connected to control voltage line Psg to be biased by the sensor control voltage, an input terminal connected to input voltage line Psd to be biased by the sensor input voltage, and an output terminal connected to switching element Qs. Sensing element Qp1 includes a photoelectric material that generates a photocurrent upon receipt of light. An example of sensing element Qp1 is a thin film transistor having an amorphous silicon or polysilicon channel that can generate a photocurrent. The sensor control voltage applied to the control terminal of sensing element Qp1 is sufficiently low or sufficiently high to keep sensing element Qp1 in an off state without incident light. The sensor input voltage applied to the input terminal of sensing element Qp1 is sufficiently high to keep the photocurrent flowing in a switching element Qs direction.

Switching element Qs also has three terminals, i.e., a control terminal connected to sensor scanning line $S_\alpha$, an input terminal connected to the output terminal of sensing element Qp1, and an output terminal connected to sensor data line $P_\beta$. Switching element Qs outputs a sensor output signal to sensor data line $P_\beta$ in response to the sensor scanning signal from sensor scanning line $S_\alpha$. The sensor output signal is the photocurrent from sensing element Qp1.

Each of sensing units SU2 having the structure shown in FIG. 3B includes a sensing element Qp2 connected to a sensor scanning line $S_\alpha$, a sensor data line $P_\beta$, and an input voltage line Psd. Sensing element Qp2 also has three terminals, i.e., a control terminal connected to sensor scanning line $S_\alpha$, an input terminal connected to the input voltage line Psd, and an output terminal connected to sensor data line $P_\beta$. Sensing element Qp2 includes a photoelectric material that generates a photocurrent upon receipt of light, and outputs a sensor output signal to sensor data line $P_\beta$ in response to the sensor scanning signal from sensor scanning line $S_\alpha$ in a state that light is irradiated.

When sensor scanning signal Vs is larger than a predetermined voltage, sensing element Qp2 outputs the sensor output signal, and in this case, the predetermined voltage may be defined considering an operating region of sensing element Q2. When sensing unit SU2 is used, control voltage line Psg may be omitted. Switching elements Q and Qs and sensing elements Qp1 and Qp2 may be thin film transistors having an amorphous silicon or polysilicon channel.

Each of sensing units SU is not required to sense incident light. Alternatively, each sensing unit SU may sense pressure applied from the outside. In this case, sensing unit SU may include a variable capacitor (not shown) whose capacitance is varied based on the magnitude of the applied pressure. The variable capacitor includes two sensing electrodes (not shown), which are provided on the TFT array panel 100 and the common electrode panel 200, respectively, and an LC layer 3 interposed between the sensing electrodes. When pressure is applied to the common electrode panel 200, the interval between the two sensing electrodes is varied, and thereby capacitance of the variable capacitor is varied. Since the magnitude of the sensor data signal, which is dependent on the magnitude of the capacitance, is varied, a touch position is determined using the sensor data signal.

One sensing unit SU is disposed in two adjacent pixels PX. A concentration of sensing units SU may be, for example, about ¼ of the concentration of the "dots", where the term dot includes a set of different colored pixels PX and is the basic unit for representing a color and determining the resolution of the LCD. The set of pixels PX may includes a red pixel, a green pixel, and a blue pixel sequentially arranged in a row.

Furthermore, the set of pixels PX may include a red pixel, a green pixel, a blue pixel, and a white color.

As an example of sensing units SU having about ¼ concentration of the concentration of the dots, concentration in horizontal and vertical directions of sensing units SU are about half as compared with concentration of horizontal and vertical directions of pixels PX, respectively. In this case, as denoted by a character "X" in dotted lines in the LC panel assembly 300 of FIG. 1, there may be pixel rows without sensing units SU. An LCD having the concentration of sensing units SU and dots as above-described may be used in various application filed required for high letter recognition and accuracy. The concentration of sensing units SU may be varied if necessary.

As shown in FIG. 4, a sensor data line P.sub.beta, and an image data line D.sub.j+2 adjacent to sensor data line P.sub.beta., and an input voltage line Psd and an image data line D.sub.j+3 adjacent to the input voltage line Psd, are apart from each other with interposed pixels PX. Three adjacent image data lines D.sub.j, D.sub.j+1, and D.sub.j+2 connected to three respective pixels PX are included in the same dot and arranged at the left side with respect to sensing unit SU connected to a sensor data line P.sub.beta, and are disposed at the left side of the corresponding pixels. Three adjacent image data lines D.sub.j+3, D.sub.j+4, and D.sub.j+5 are connected to the corresponding three PX included in the same dot and are arranged at the right side with respect to sensing unit SU and are disposed at the right side of the corresponding pixels PX. However, with the exception of image data lines D.sub.j+2 and D.sub.j+3 closest to sensing unit PX, the disposition of the remaining image data lines D.sub.j, D.sub.j+1, D.sub.j+4, and D.sub.j+5 may be reversed from those shown in FIG. 4. From a structural view, pixels PX disposed on the right and left sides of sensing unit SU are substantially symmetrical.

The arrangement including a sensing unit SU and two dots adjacent to both sides of sensing unit SU is repeated in the pixel row. In FIG. 4, pixels are not formed between two adjacent image data lines $D_{j-1}$ and $D_j$, $D_{j+5}$ and $D_{j+6}$, . . . respectively disposed on two adjacent arrangement units. However, as above-described, in a case that the disposition of image data lines $D_j$, $D_{j+1}$, $D_{j+5}$, and $D_{j+4}$ secondly and thirdly next to the sensing unit SU is reversed with respect to FIG. 4, that is, image data lines $D_j$, $D_{j+1}$, $D_{j+5}$, and $D_{j+4}$ are located on the left side of each pixel PX, pixels PX are not formed between two adjacent image data lines in an arrangement unit.

Accordingly, the intervals between sensor data line P and image data lines $D_{j+2}$ and $D_{j+3}$ are lengthened because of pixels PX interposed between sensor data line $P_\beta$ and image data line $D_{j+2}$ and $D_{j+3}$, respectively, thereby decreasing distortion of sensor data signal Vp due to variation of an image data signal Vd. The arrangement may be adapted to accommodate a situation where a dot has four or more pixels in the same manner.

By connecting two sensor scanning lines $S_\alpha$ connected to the two sensing units SU formed in the two pixel row adjacent in a longitudinal direction, sensor output signals from the respective sensing units SU are superposed on a sensor data line $P_\beta$ to be output as a sensor data signal Vd. When control is based on sensor data signal Vd superposed on a sensor output signal, characteristic deviation between sensing units SU decreases, and signal to noise ratio doubles to increase accuracy of touch information. Although the number of sensing units SU connected to a sensor data line $P_\beta$ doubles, the number of sensor data signals Vp is substantially one, so the concentration of sensing units SU is defined by the number of sensor data signals Vp.

Referring to FIG. 1 again, the gray voltage generator 800 generates two sets of a plurality of gray voltages (or reference gray voltages) related to the transmittance of the pixels. The gray voltages in one set have a positive polarity with respect to the common voltage Vcom, while those in the other set have a negative polarity with respect to the common voltage Vcom.

Image scanning driver 400 is connected to image scanning lines $G_i$ of panel assembly 300, and synthesizes a gate-on voltage and a gate-off voltage to generate image scanning signals Vg for application to image scanning lines $G_i$. Image data driver 500 is connected to image data lines $D_j$ of the panel assembly 300 and applies image data signals Vd, which are selected from the gray voltages supplied from the gray voltage generator 800, to image data lines $D_j$. However, the data driver 500 may generate gray voltages for all the grays by dividing the reference gray voltages and selecting the data voltages from the generated gray voltages when the gray voltage generator 550 generates reference gray voltages.

Sensor scanning driver 700 is connected to sensor scanning lines $S_\alpha$ of the panel assembly 300, and synthesizes a gate-on voltage and a gate-off voltage to generate sensor scanning signals Vs for application to sensor scanning lines $S_\alpha$. Alternatively, sensor scanning driver 700 may synthesize a high voltage for generating a photocurrent and a low voltage for not generating the photocurrent to generate sensor scanning signal Vs for application to sensor scanning lines $S_\alpha$.

Sensing signal processor 800 is connected to sensor data lines $P_\beta$ of the panel assembly 300 and, after signal processing such as amplifying and filtering, receives and analog-to-digital converts sensor data signals Vp from sensor data lines $P_\beta$ to generate digital sensing signals DSN.

A sensor data signal Vp flowing in a sensor data line $P_\beta$ at a certain time may include one sensor output signal from one sensing element Qp1 or Qp2, or two or more sensor output signals from two or more sensing elements Qp1 and Qp2.

Signal controller 600 controls image scanning driver 400, image data driver 500, sensor scanning driver 700, sensing signal processor 800, etc.

Each of the processing units 400, 500, 550, 600, 700, and 800 may include at least one integrated circuit (IC) chip mounted on the LC panel assembly 300 or on a flexible printed circuit (FPC) film in a tape carrier package (TCP) type, which are attached to the panel assembly 300. Alternately, at least one of the processing units 400, 500, 550, 600, 700, and 800 may be integrated into the panel assembly 300 along with signal lines $G_i$, $D_j$, $S_\alpha$, $P_\beta$, Psg, and Psd, switching elements Q, Qs, Qp1, and Qp2. Alternatively, all the processing units 400, 500, 550, 600, 700, and 800 may be integrated into a single IC chip, but at least one of the processing units 400, 500, 550, 600, 700, and 800 or at least one circuit element thereof may be disposed outside of the single IC chip.

Now, the operation of the above-described LCD will be described in detail.

Signal controller 600 is supplied with input image signals R, G, and B and input control signals for controlling the display thereof from an external graphics controller (not shown). The input image signals R, G, and B contain luminance information of each pixel PX, and the luminance has a predetermined number of, for example 1024 ($=2^{10}$), 256 ($=2^8$), or 64 ($=2^6$) grays. The input control signals include a vertical synchronization signal Vsync, a horizontal synchronization signal Hsync, a main clock signal MCLK, a data enable signal DE, etc.

On the basis of the input control signals and the input image signals R, G, and B, signal controller 600 generates image scanning control signals CONT1, image data control signals CONT2, sensor scanning control signals CONT3, and sensor data control signals CONT4, and it processes image signals R, G, and B to be suitable for the operation of the panel assembly 300. Signal controller 600 sends image scanning control signals CONT1 to image scanning driver 400, the processed image signals DAT and image data control signals CONT2 to image data driver 500, sensor scanning control signals CONT3 to sensor scanning driver 700, and sensor data control signals CONT4 to sensing signal processor 800.

Image scanning control signals CONT1 include an image scanning start signal STV for instructing to start image scanning, and at least one clock signal for controlling the output time of the first high voltage. Image scanning control signals CONT1 may include an output enable signal OE for defining the duration of the first high voltage.

Image data control signals CONT2 include a horizontal synchronization start signal STH for informing of start of image data transmission for a group of pixels PX, a load signal LOAD for instructing to apply image data signals Vd to image data lines $D_j$, and a data clock signal HCLK. Image data control signals CONT2 may further include an inversion signal RVS for reversing the polarity of the image data signals (with respect to the common voltage Vcom).

In response to image data control signals CONT2 from signal controller 600, image data driver 500 receives a packet of the digital image data DAT for the group of pixels PX from signal controller 600, converts the digital image signals DAT into analog image data signals Vd selected from the gray voltages supplied from the gray voltage generator 550, and applies the analog image data signals to image data lines $D_j$ Image scanning driver 400 applies the first high Von to image scanning line $G_i$ in response to image scanning control signals CONT1 from signal controller 600, thereby turning on switching elements Q connected thereto. Image data voltages Vd applied to image data lines $D_j$ are supplied to pixels PX through the activated switching elements Q.

A difference between the voltage of an image data signal Vd and the common voltage Vcom is represented as a voltage across the LC capacitor $C_{LC}$, which is referred to as a pixel voltage. The LC molecules in the LC capacitor $C_{LC}$ have orientations that depend on the magnitude of the pixel voltage, and the molecular orientations determine the polarization of light passing through LC layer 3. Polarizer(s) convert the light polarization into the light transmittance to display images.

By repeating this procedure each horizontal period (also referred to as "1H" which is equal to one period of the horizontal synchronization signal Hsync and the data enable signal DE), all image scanning lines $G_i$ are sequentially supplied with the first high voltage, thereby applying image data signals Vd to all pixels PX to display an image for a frame.

When the next frame starts after one frame finishes, the inversion control signal RVS applied to image data driver 500 is controlled such that the polarity of the data voltages is reversed (which is referred to as "frame inversion"). The inversion control signal RVS may also be controlled such that the polarity of the image data signals flowing in an image data line is periodically reversed during one frame (for example, row inversion and dot inversion), or the polarity of the image data signals in one packet is reversed (for example, column inversion and dot inversion).

Sensor scanning driver 700 applies the gate-on voltage to sensor scanning lines $S_\alpha$ to turn on switching elements Qs connected thereto in response to sensing control signals CONT3. Then, switching elements Qs output sensor output signals from sensing elements Qp1 to sensor data lines $P_\beta$ to form sensor data signals Vp, and sensor data signals Vp are inputted into sensing signal processor 800. Alternatively, sensor scanning driver 700 may apply a high voltage to sensor scanning lines $S_\alpha$. Thereby, sensing elements Qp2 connected to sensor scanning lines $S_\alpha$ may apply a photocurrent to sensor data lines $P_\beta$ as sensor data signals VP.

Sensing signal processor 800 reads sensor data signals Vp flowing in sensor data lines P, in response to sensor data control signals CONT4. Sensing signal processor 800 processes, for example through amplifying and filtering, read sensor data signals Vp and converts the analog sensor data signals into digital sensing signals DSN to be sent to signal controller 600.

By repeating this procedure for one or more horizontal periods in accordance with a vertical concentration of sensing units SU formed in the longitudinal direction, all image sensor scanning lines S are sequentially supplied with the gate-on voltage or the high voltage, thereby processing sensor data signals Vp from all sensing units SU to generate the digital sensing signals DSN.

Signal controller 600 appropriately processes the digital sensing signals DSN with respect to a frame from sensing signal processor 800 to determine and send to the external device (not shown) whether and where a touch occurs.

The external device sends image signals R, G, and B that are generated based on the touch information to the LCD. Alternatively, the external device may directly receive and process sensing signals DSN to determine the touch information. The sensing operation is carried out separately from and does not influence the display operation.

Figure 5:
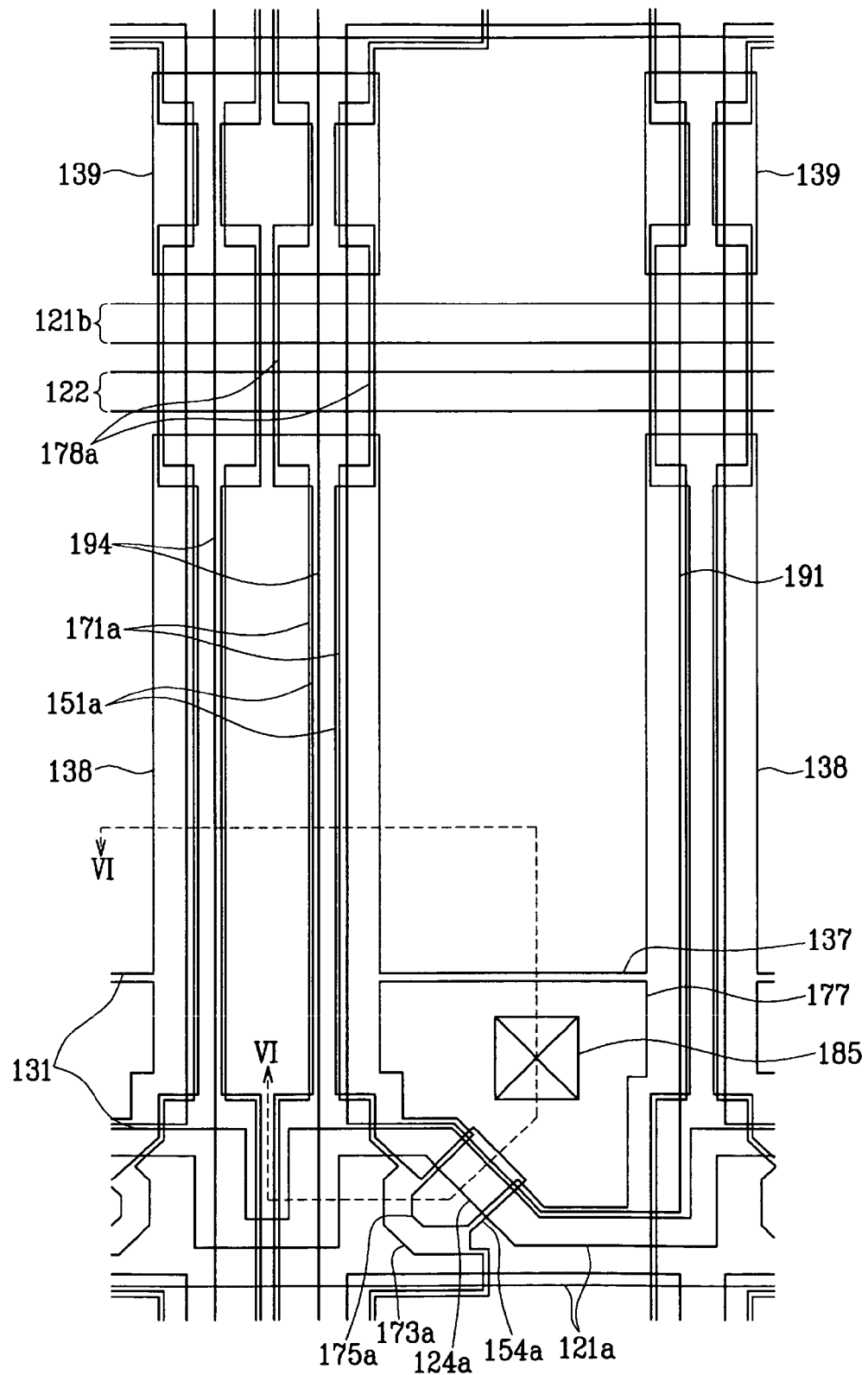
FIG. 5 is a layout view of a common electrode panel for an LCD according to an embodiment of the present invention, and in particular, a layout view with respect to an "RA" portion of FIG. 4.
Figure 6:
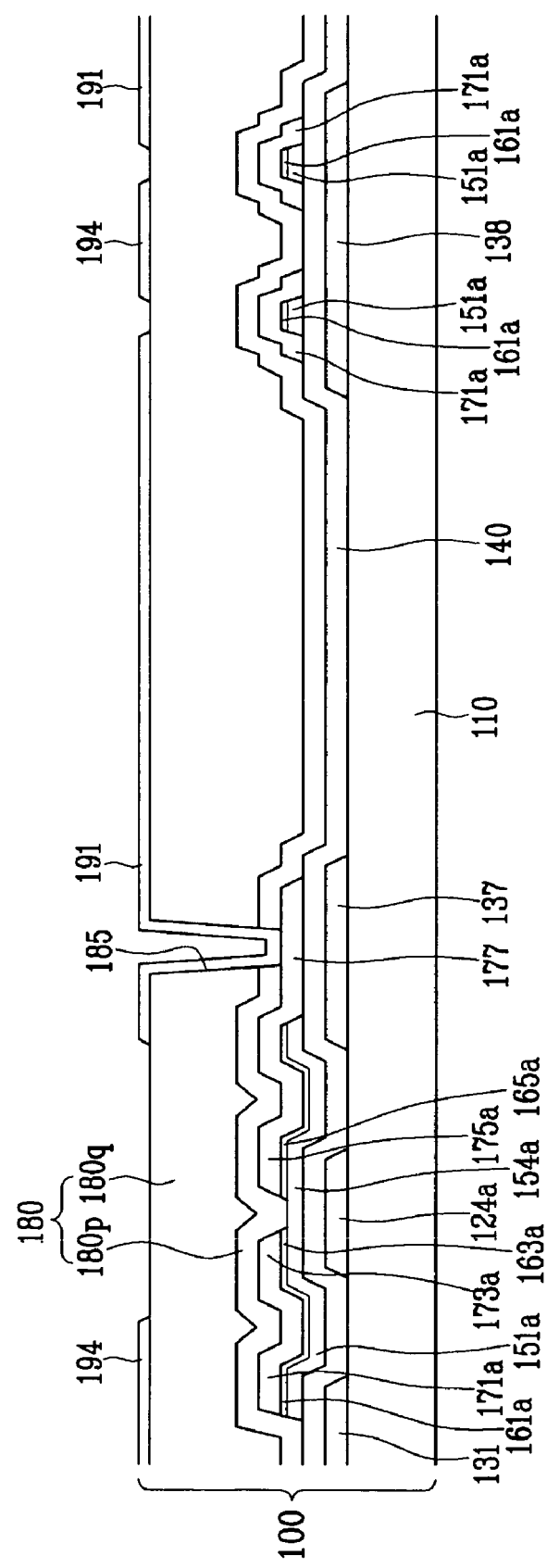
FIG. 6 is a sectional view of the common electrode panel shown in FIG. 5 taken along the line VI-VI.
Figure 7:
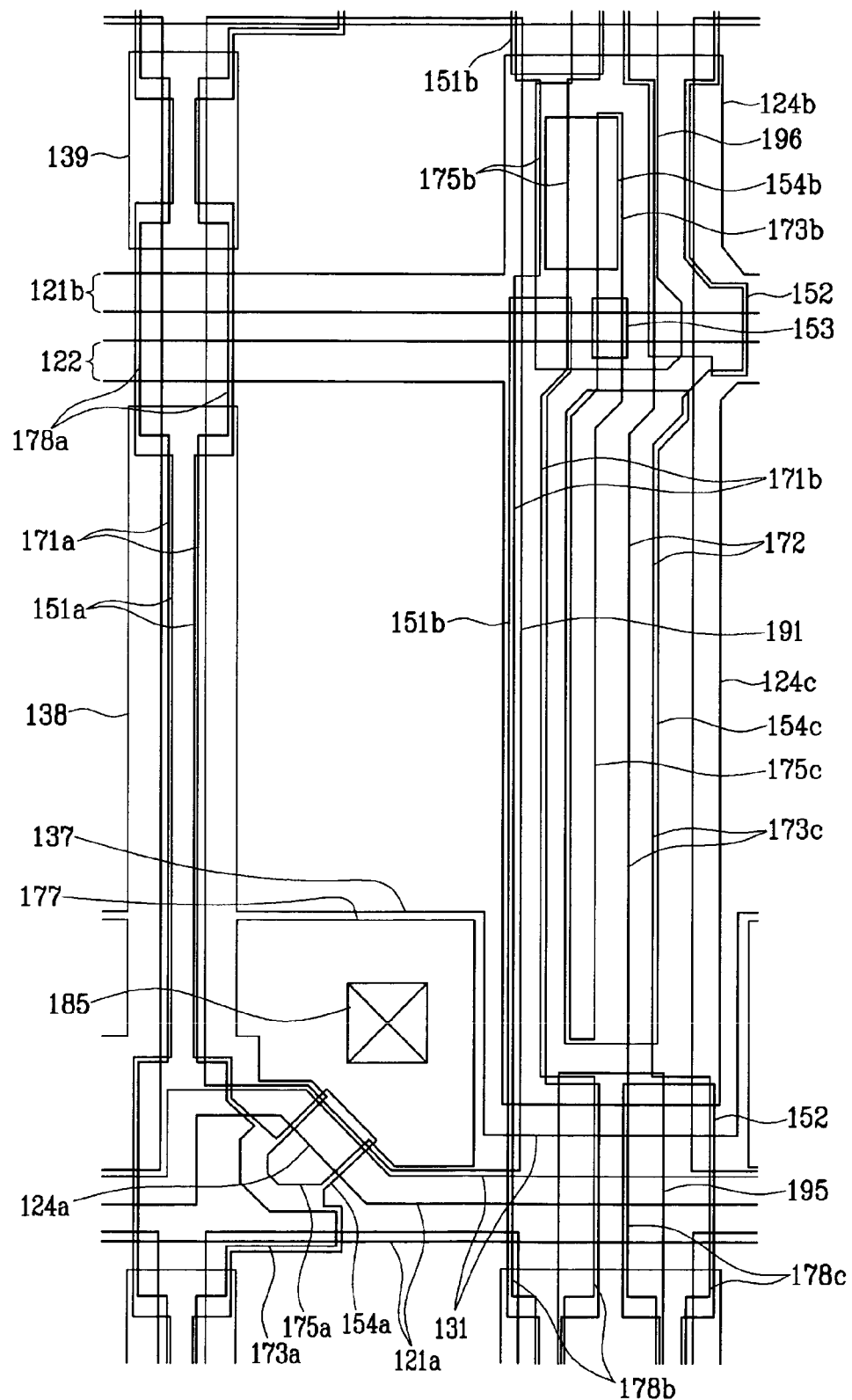
FIG. 7 is a layout view of a thin film transistor panel for an LCD according to an embodiment of the present invention, and in particular, a layout view with respect to an "RB" portion of FIG. 4.
Figure 8:
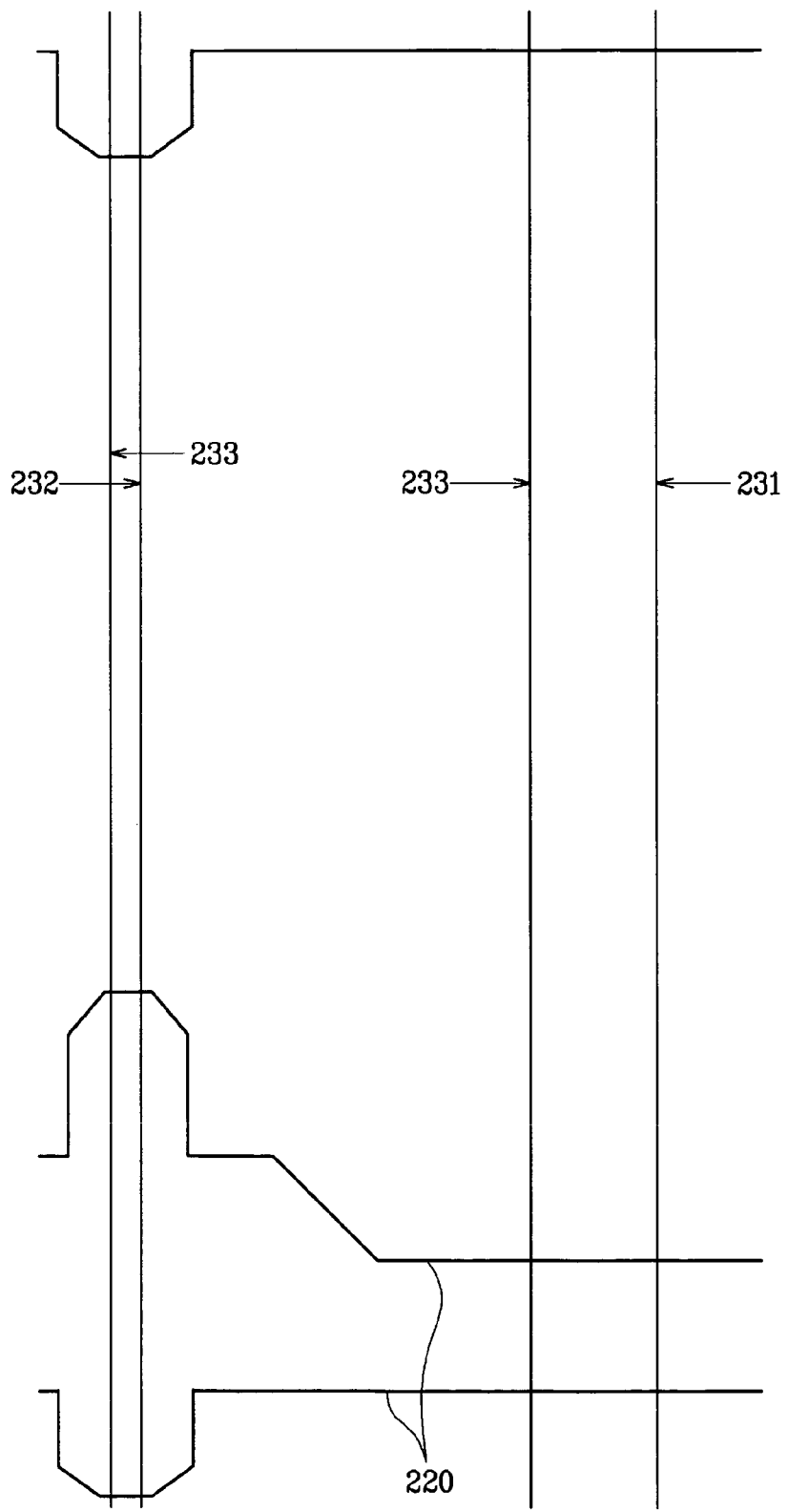
FIG. 8 is a layout view of a common electrode panel for an LCD according to an embodiment of the present invention, and in particular, a layout view with respect to an "RB" portion of FIG. 4.
Figure 9:
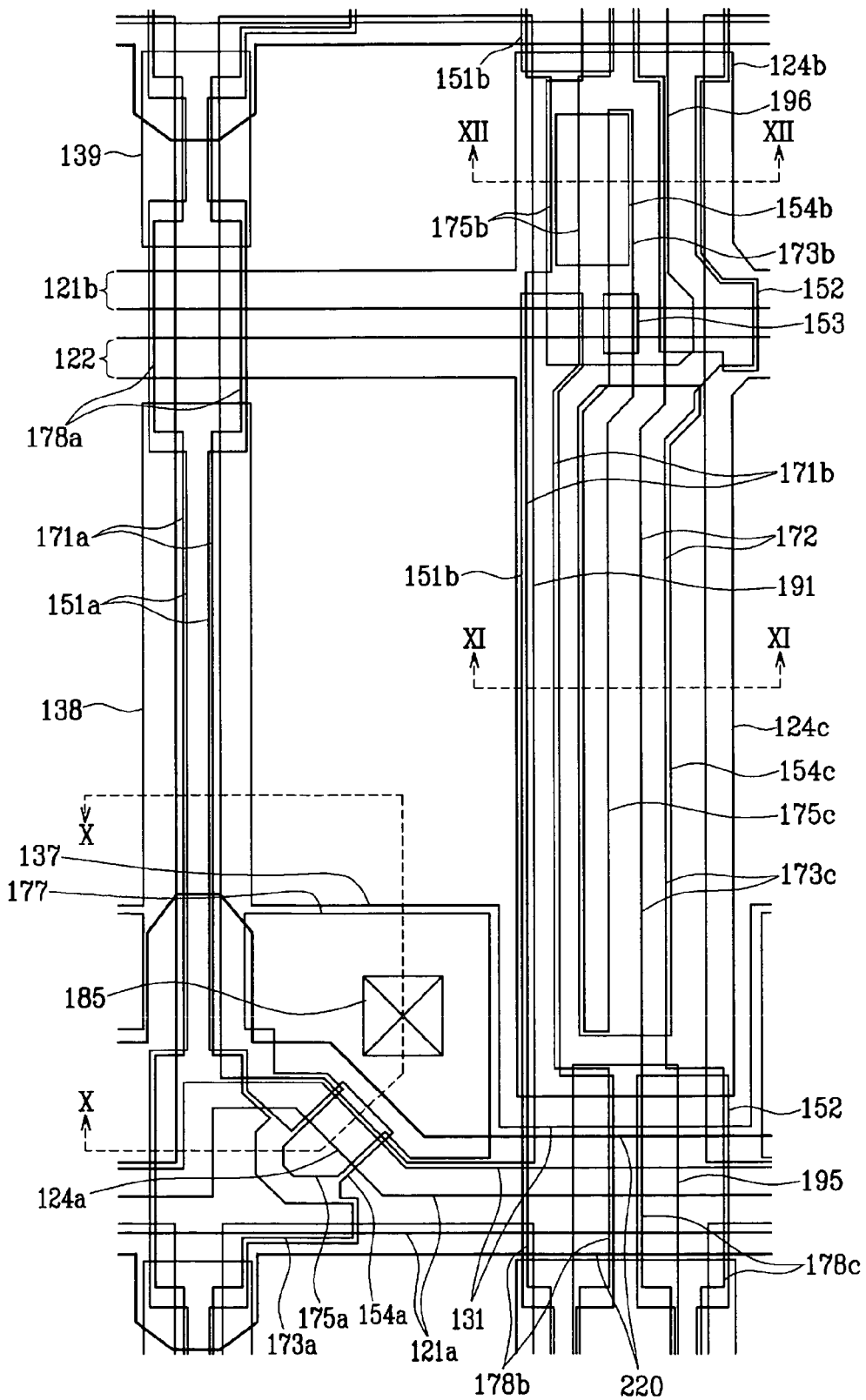
FIG. 9 is a layout view of an LCD including the thin film transistor panel shown in FIG. 7 and the common electrode panel shown in FIG. 8.
Figure 10:
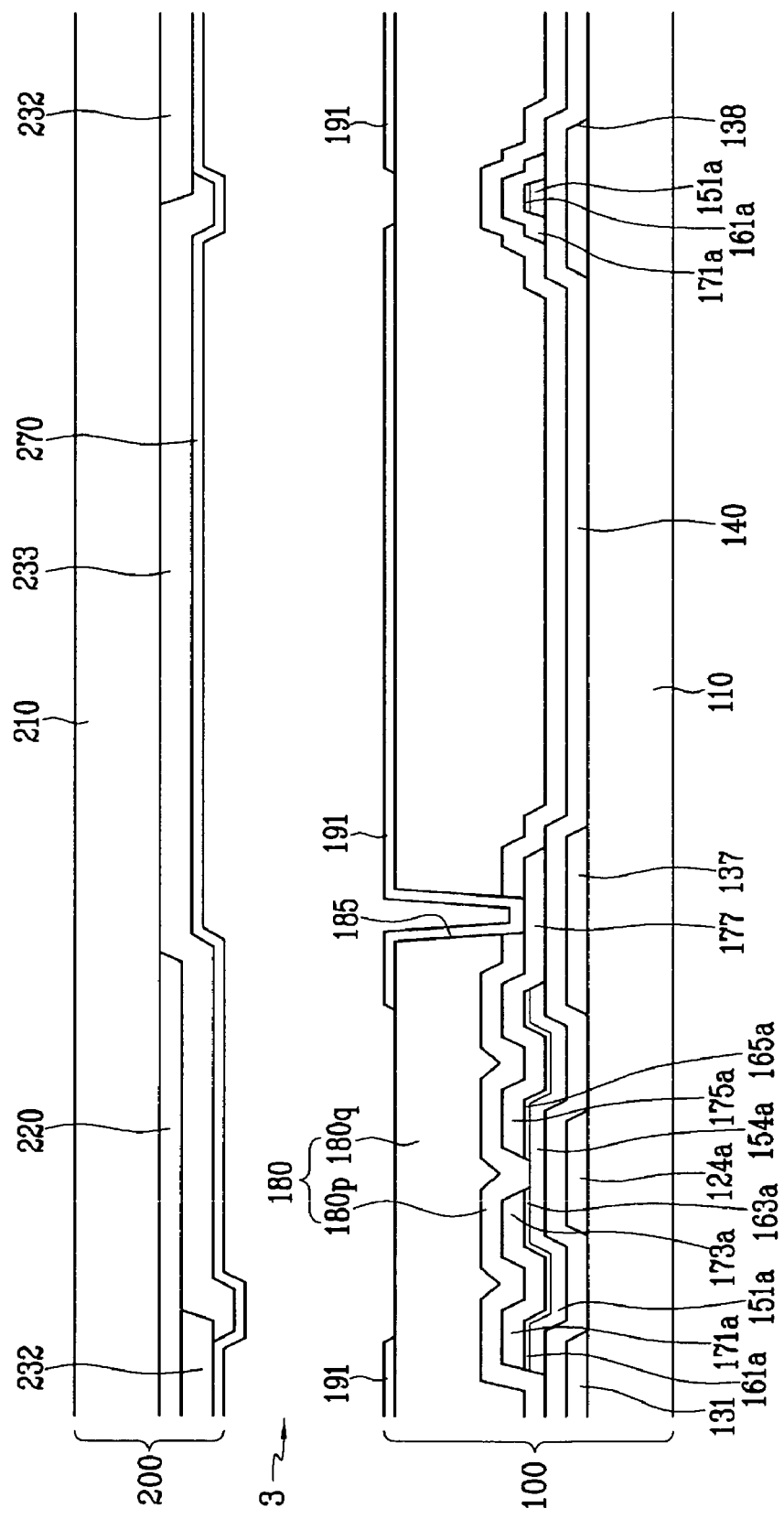
FIGS. 10 to 12 are sectional views of the LCD shown in FIG. 9 taken along the lines X-X, XI-XI, and XII-XII, respectively.
Figure 11:
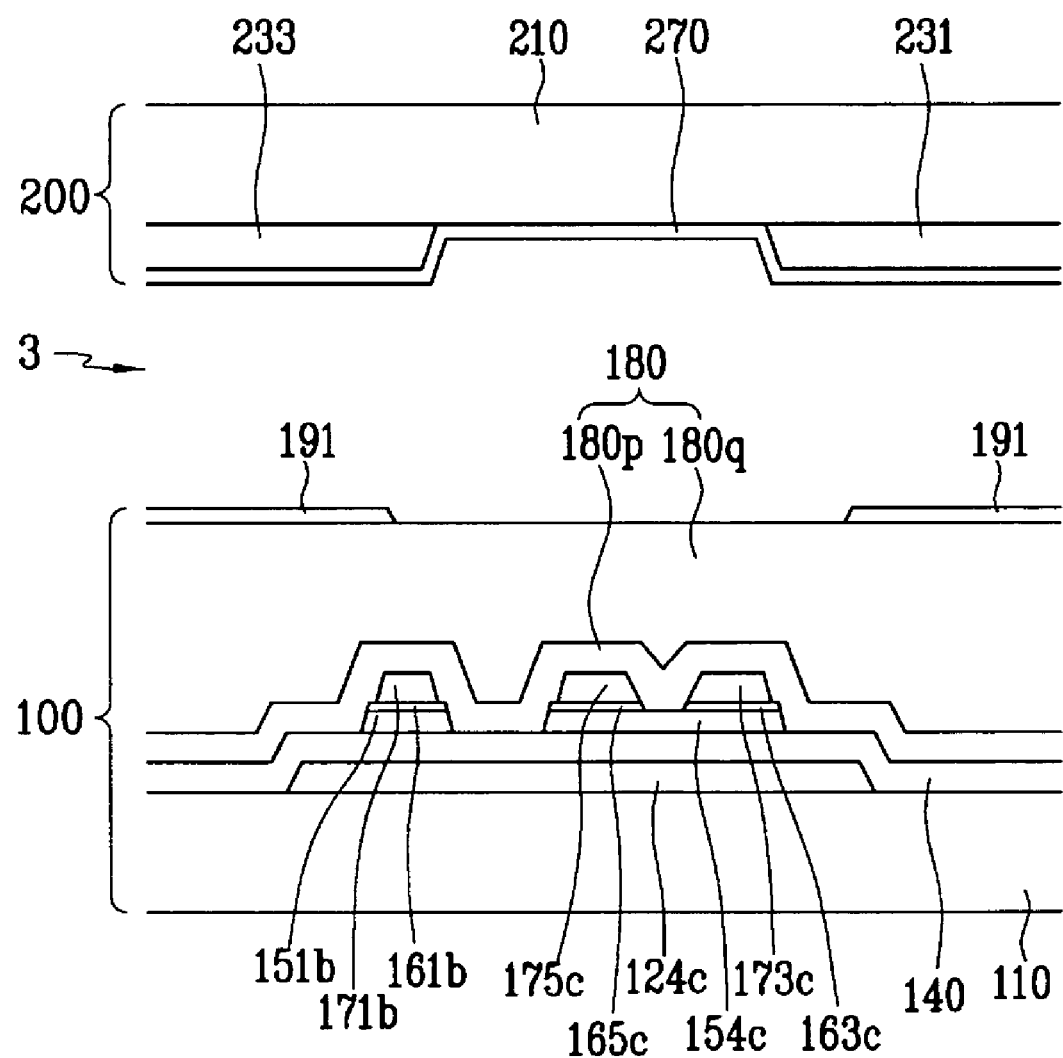
Figure 12:
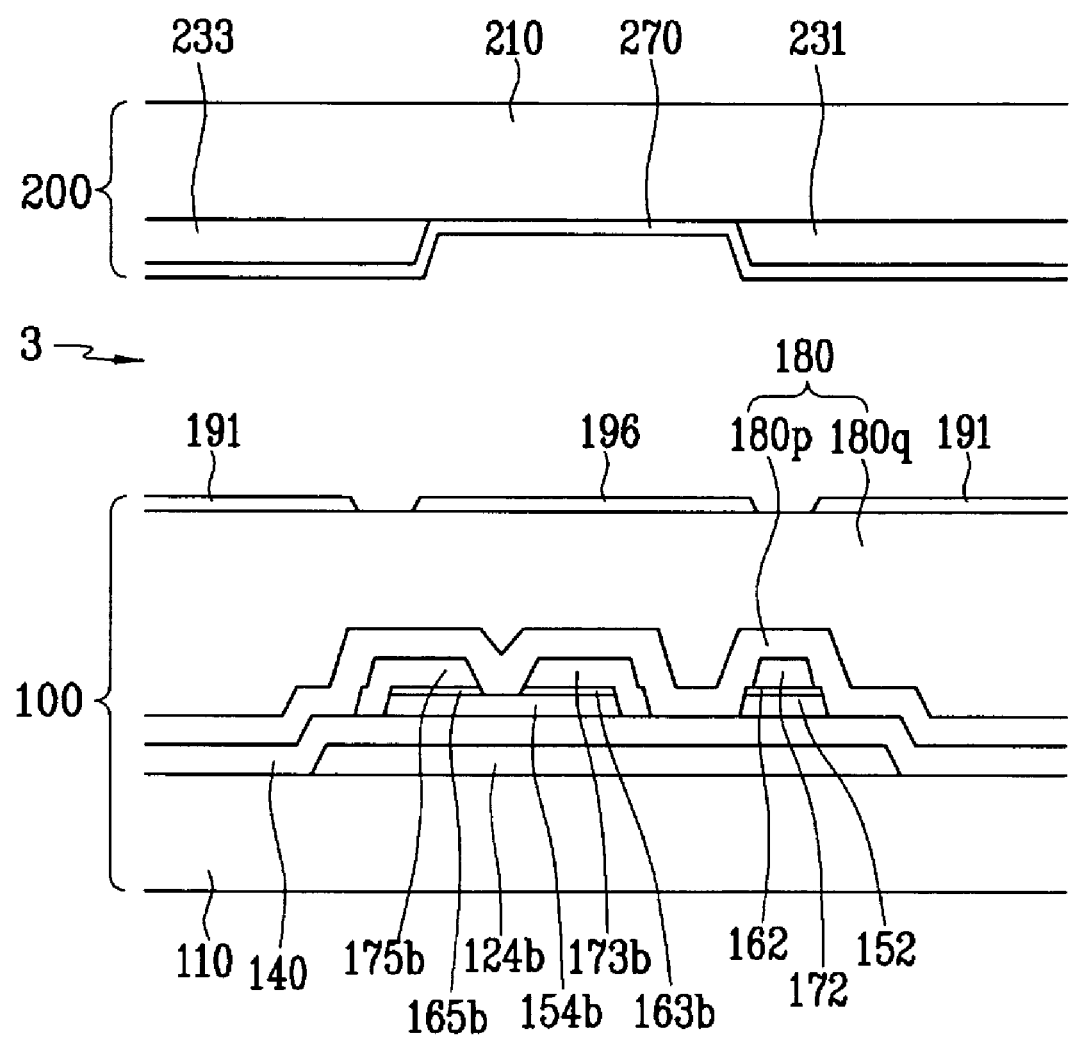

Next, a structure of an LCD according to an embodiment of the present invention will be described with reference to FIGS. 5 to 12. FIG. 5 is a layout view of a common electrode panel for an LCD according to an embodiment of the present invention, and, in particular, a layout view with respect to an "RA" portion of FIG. 4, and FIG. 6 is a sectional view of the common electrode panel shown in FIG. 5 taken along the line VI-VI. FIG. 7 is a layout view of a thin film transistor panel for an LCD according to an embodiment of the present invention, and, in particular, a layout view with respect to an "RB" portion of FIG. 4, and FIG. 8 is a layout view of a common electrode panel for an LCD according to an embodiment of the present invention, and, in particular, a layout view with respect to an "RB" portion of FIG. 4. FIG. 9 is a layout view of an LCD including the thin film transistor panel shown in FIG. 7 and the common electrode panel shown in FIG. 8, and FIGS. 10 to 12 are sectional views of the LCD shown in FIG. 9 taken along the lines X-X, XI-XI, and XII-XII, respectively.

Referring to FIGS. 5-12, the LCD includes a TFT array panel 100, a common electrode panel 200, and a LC layer 3 interposed between the panels 100 and 200. TFT array panel 100 will now be described in detail with reference FIGS. 5-7 and 9-12. A plurality of gate conductors including a plurality of image scanning lines 121a, a plurality of sensor scanning lines 121b, a plurality of control voltage lines 122, a plurality of storage electrode lines 131, and a plurality of light blocking member islands 139 are formed on an insulating substrate 110 made of a material such as transparent glass or plastic.

Image scanning lines 121a transmit image scanning signals Vg and extend substantially in a transverse direction. Each image scanning line 121a includes a plurality of first control electrodes 124a projecting upward.

Sensor scanning lines 121b transmit sensor scanning signals Vs and extend substantially in parallel to image scanning lines 121a. Each sensor scanning line 121b includes a plurality of second control electrodes 124b projecting upward. Each second control electrode 124b has a large area and prevents light leakage.

Control voltage lines 122 are supplied with sensor control voltages and extend substantially in parallel to sensor scanning lines 121b. Each control voltage line 122 is adjacent to a sensor scanning line 121b and includes a plurality of third control electrodes 124c projecting downward. Each third control electrode 124c has a large area and prevents light leakage.

Storage electrodes 131 are supplied with a predetermined voltage such as a common voltage Vcom, and extend substantially in parallel to image scanning lines 121a. Each storage electrode 131 is disposed adjacent to image scanning line 121a and includes a plurality of storage electrodes 137 for storage capacitors $C_{ST}$ and a plurality of light blocking portions 138 projecting upward and preventing light leakage. The light blocking portions 138 includes first light blocking portions and second light blocking portions, and the first light blocking portions have relatively wider widths than those of the second light blocking portions.

Light blocking member islands 139 prevent light leakage and are disposed between previous image scanning lines 121a and sensor scanning lines 121b on extension lines of the light blocking portions 138 of storage electrode lines 131. Light blocking member islands 139 also include first light blocking member islands and second light blocking member islands. The first light blocking member islands disposed on the extension lines of first light blocking portions 138 have relatively wider widths than those of the second light blocking member islands. The second light blocking member islands are disposed on the extension lines of the second light blocking portions 138.

Gate conductors 121a, 121b, 122, 131, and 139 are preferably made of an Al-containing metal such as Al and an Al alloy, a Ag-containing metal such as Ag and a Ag alloy, a Cu-containing metal such as Cu and a Cu alloy, a Mo-containing metal such as Mo and a Mo alloy, Cr, Ta, or Ti. However, they may have a multi-layered structure including two conductive films (not shown) having different physical characteristics. One of the two films is preferably made of a low resistivity metal including an Al-containing metal, an Ag-containing metal, and a Cu-containing metal for reducing signal delay or voltage drop. The other film is preferably made of a material such as a Mo-containing metal, Cr, Ta, or Ti, which has good physical, chemical, and electrical contact characteristics with other materials such as indium tin oxide (ITO) or indium zinc oxide (IZO). Good examples of the combination of the two films are a lower Cr film and an upper Al (alloy) film and a lower Al (alloy) film and an upper Mo (alloy) film. However, the gate conductors 121a, 121b, 122, 131, and 139 may be made of various metals or conductors.

The lateral sides of gate conductors 121a, 121b, 122, 131, and 139 are inclined relative to the surface of substrate 110 at inclination angles lying in the range about 30-80 degrees.

Gate insulating layer 140 preferably made of silicon nitride (SiNx) or silicon oxide (SiOx) is formed on the gate conductors 121a, 121b, 122, 131, and 139. A plurality of semiconductor stripes 151a, 151b, and 152 and a plurality of semiconductor islands 153, 154b, and 154c preferably made of hydrogenated amorphous silicon (abbreviated to "a-Si") or polysilicon are formed on insulating layer 140. Each of semiconductor stripes 151a extends substantially in the longitudinal direction and includes a plurality of projections 154a branched out toward first control electrodes 124. Each semiconductor stripe 151a becomes wider near portions intersecting scanning lines 121a and 121b, control voltage lines 122, and storage electrode lines 131 such that semiconductor stripe 151a covers large areas of the scanning lines 121a and 121b, control voltage lines 122, and storage electrode lines 131.

Semiconductor stripes 151b and 152 extend substantially in the longitudinal direction and becomes wide near the scanning lines 121a and 121b, control voltage lines 122, and storage electrode lines 131 such that semiconductor stripes 151b and 152 cover large areas of the scanning lines 121a and 121b, control voltage lines 122, and storage electrode lines 131. However, semiconductor stripes 151b and 152 are not formed on portions of the second and third control electrodes 124b and 124c.

Each semiconductor island 153 is disposed over sensor scanning line 121b and control voltage line 122. Semiconductor islands 154b and 154c are disposed over the second and third control electrodes 124b and 124c and disposed on portions without semiconductor stripes 151b and 152, respectively.

A plurality of ohmic contact stripes and islands 161a, 161b, 162, 163b, 163c, 165a, 165b, and 165c are formed on semiconductors 151a, 151b, 152, 153, 154b, and 154c. Ohmic contacts 161a, 161b, 162, 163b, 163c, 165a, 165b, and 165c are preferably made of n+ hydrogenated a-Si heavily doped with an n-type impurity such as phosphorous or they may be made of silicide. Each of ohmic contact stripes 161a includes a plurality of projections 163a, and the projections 163a and ohmic contact islands 165a are located in pairs on the projections 154a of semiconductor stripes 151a. Projections 163b and ohmic contact islands 165b are located in pairs on the projections 154b of semiconductor islands 154c.

The lateral sides of semiconductors 151a, 151b, 152, 153, 154b, and 154c and ohmic contacts 161a, 161b, 162, 163b, 163c, 165a, 165b, and 165c are inclined relative to the surface of substrate 110 having inclination angles that are preferably in the range of about 30-80 degrees.

A plurality of data conductors including a plurality of image data lines 171a, a plurality of input voltage lines 172, a plurality of input electrodes 173b, and a plurality of first and third output electrodes 175a and 175c are formed on ohmic contacts 161a, 161b, 162, 163b, 163c, 165a, 165b, and 165c and the gate insulating layer 140.

Image data lines 171a transmit image data signals Vd and extend substantially in the longitudinal direction to intersect scanning lines 121a and 121b, control voltage lines 122, and storage electrode lines 131. Each image data line 171a includes a plurality of expansions 178a and a plurality of first input electrodes 173a. Each expansion 178a becomes wide near the scanning lines 121a and 121b, control voltage lines 122, and storage electrode lines 131, to cover large areas of the scanning lines 121a and 121b, control voltage lines 122, and storage electrode lines 131. Each first input electrode 173a projects toward first control electrode 124.

First output electrodes 175a are separated from image data lines 171a and are disposed opposite the input electrodes 173a with respect to first control electrodes 124a. Each of first output electrodes 175a has a wide and rectangular-shaped expansion 177 overlapping storage electrode 137 and the bar shaped portion, of which a portion is surrounded by the curved first input electrode 173a.

A first control electrode 124a, a first input electrode 173a, and a first output electrode 175a along with a projection 154a of a semiconductor stripe 151a form a TFT having a channel formed in the projection 154a disposed between first input electrode 173a and first output electrode 175a. The TFT functions as a switching element Q.

Sensor data lines 171b transmit sensor data signals Vp and extend substantially in the longitudinal direction to intersect the scanning lines 121a and 121b and storage electrode lines 131. Each sensor data line 171b includes a plurality of expansions 178b for blocking light and a plurality of second output electrodes 175b disposing on semiconductor islands 154b. Each expansion 178b becomes wide near the scanning lines 121a and 121b, control voltage lines 122, and storage electrode lines 131, to cover large areas of the scanning lines 121a and 121b, control voltage lines 122, and storage electrode lines 131.

The second input electrodes 173b are separated from sensor data lines 171b and are disposed opposite second output electrodes 175b with respect to semiconductor islands 154b.

A second control electrode 124b, a second input electrode 173b, and a second output electrode 175b along with a semiconductor island 154b form a TFT having a channel formed in semiconductor island 154b disposed between the second input electrode 173b and the second output electrode 175b. The TFT functions as a switching element Qs.

Input voltage lines 172 are supplied with sensor input voltages and extend substantially in the longitudinal direction to intersect scanning lines 121a and 121b, control voltage lines 122, and storage electrode lines 131. Each input voltage line 172 includes a plurality of expansions 178c for blocking light and a plurality of third input electrodes 173c disposing on semiconductor islands 154c. Each expansion 178c becomes wide near the scanning lines 121a and 121b, control voltage lines 122, and storage electrode lines 131, to cover large areas of the scanning lines 121a and 121b, control voltage lines 122, and storage electrode lines 131.

Third output electrodes 175c are separated from input voltage lines 172 and are disposed opposite third input electrodes 173c with respect to semiconductor islands 154c. Third output electrodes 175c are connected to the second input electrodes 173b.

A third control electrode 124c, a third input electrode 173c, and a third output electrode 175c along with a semiconductor island 154c form a TFT having a channel formed in semiconductor island 154c disposed between the third input electrode 173c and the third output electrode 175c. As described above, since the channel is formed on semiconductor island 154c having a long shape in the longitudinal direction, the width of the channel becomes large and the amount of current passing through the channel increases. The TFT functions as a sensing element Qp1.

As described above, the expansions 178a-178c for blocking light become large near the scanning lines 121a and 121b, control voltage lines 122, and storage electrode lines 131, to prevent light leakage of portions that are not covered by the light blocking portions 138 of storage electrode lines 131, the light blocking member islands 139, and the second and third control electrodes 124b and 124c.

Data conductors 171a, 171b, 172, 173b, 175a, and 175c are preferably made of a refractory metal such as Cr, Mo, Ta, Ti, or alloys thereof. However, they may have a multilayered structure including a refractory metal film (not shown) and a low resistivity film (not shown). Good examples of the multilayered structure are a double-layered structure including a lower Cr/Mo (alloy) film and an upper Al (alloy) film, and a triple-layered structure of a lower Mo (alloy) film, an intermediate Al (alloy) film, and an upper Mo (alloy) film. However, the data conductors 171a, 171b, 172, 173b, 175a, and 175c may be made of various metals or conductors.

Data conductors 171a, 171b, 172, 173b, 175a, and 175c have inclined edge profiles inclined at angles in the range from about 30-80 degrees.

Ohmic contacts 161a, 161, 162, 163b, 163c, and 165a-165c are interposed only between the underlying semiconductors 151, 151b, 152, 153, 154b, and 154c and the overlying data conductors 171a, 171b, 172, 173b, 175a, and 175c thereon and reduce the contact resistance therebetween. Although semiconductors 151a, 151b, 152, and 153 are narrower than data lines 171a and 171b and input voltage lines 172 at most places, the width of semiconductors 151a, 151b, 152, and 153 becomes large near scanning lines 121a and 121b, control voltage lines 122, and storage electrode lines 131 as described above, to smooth the profile of the surface, thereby preventing the disconnection of the data lines 171a and 171b and input voltage lines 172. Semiconductors 151, 151b, 152, 153, 154b, and 154c include some exposed portions, which are not covered with the data conductors 171a, 171b, 172, 173b, 175a, and 175c, such as portions located between the input electrodes 173a-173c and the output electrodes 175a-175c.

A passivation layer 180 is formed on data conductors 171a, 171b, 172, 173b, 175a, and 175c and the exposed portions of semiconductors 151a, 151b, 152, 153, 154b, and 154c. Passivation layer 180 includes a lower passivation film 180p preferably made of an inorganic insulator such as silicon nitride or silicon oxide, and an upper passivation film 180q preferably made of an organic insulator. Preferably, the upper passivation film 180q may have dielectric constant of less than about 4.0 and photosensitivity, and it may provide a flat surface. The passivation layer 180 may have a single-layer structure preferably made of an inorganic or organic insulator. Passivation layer 180 has a plurality of contact holes 185 exposing first output electrodes 175.

A plurality of pixel electrodes 191 and a plurality of first and second longitudinal lines 194 and 195 for blocking light are formed on the passivation layer 180. Pixel electrodes 191 are physically and electrically connected to first output electrodes 175a through the contact holes 185 such that pixel electrodes 191 receive data voltages Vd from first output electrodes 175a. Pixel electrodes 191 that is supplied with the data voltages Vd generate electric fields in cooperation with a common electrode 270 of the opposing common electrode panel 200 that is supplied with a common voltage Vcom, which determine the orientations of LC molecules (not shown) of an LC layer 3 disposed between the two panels 100 and 200. The polarization of light passing the LC layer 3 is varied based on the orientations of the determined LC molecules. A pixel electrode 191 and the common electrode 270 form a capacitor $C_{LC}$ referred to as a "liquid crystal capacitor," which stores applied voltages after the TFT turns off.

Pixel electrode 191 and an expansion 177 of a first output electrode 175a connected thereto overlap storage electrode 137. Pixel electrode 191, first output electrode 175a connected thereto, and storage electrode 137 form a storage capacitor $C_{ST}$, which enhances the voltage storing capacity of the LC capacitor $C_{LC}$. Pixel electrodes 191 overlap image scanning lines 121a, image data lines 171a, sensor data lines 171b, and the input voltage lines 172 to increase aperture ratio, but may not overlap.

Light blocking portions 138 of storage electrode lines 131 and light blocking member islands 139 disposed on portions where two image data lines 171a are disposed between adjacent pixel electrodes 191 have large widths, while light blocking portions 138 and light blocking member islands 139 disposed on portions where one image data line 171a is disposed between adjacent pixel electrodes 191 have narrow widths.

First and second longitudinal lines 194 and 195 prevent light leakage and extend substantially in the longitudinal direction. Each first longitudinal line 194 is disposed on the two adjacent image data lines 171a and each second longitudinal line 195 includes expansions 196 covering semiconductor islands 154b. Second longitudinal lines 195 are disposed on sensor data lines 171b and the input voltage lines 172, but are not disposed on semiconductor islands 154c.

First and second longitudinal lines 194 and 195 prevent light leakage of portions that are not covered by the light blocking portions 138 of storage electrode lines 131, the light blocking member islands 139, and the second and third control electrodes 124b and 124c. In particular, the expansions 196 of the second longitudinal lines 195 prevent light incident from the upper side and block it to induce the incident light to semiconductor islands 154b. However, semiconductor islands 154c are exposed to light incident from the outside because the second longitudinal lines 195 are not formed on semiconductor islands 154.

First and second longitudinal lines 194 and 195 are preferably made of an opaque material such as Al, Ag, Cr, or alloys thereof. However, first and second longitudinal lines 194 and 195 may have a double-layered structure including of a lower ITO or IZO film and an upper film of Al, Ag, or alloys thereof, and furthermore, they may have a triple-layered structure of an intermediate film having good contact characteristic with ITO or IZO, along with the lower and upper films.

A description of the common electrode panel 200 follows. A plurality of transverse lines 220 for blocking light are formed on an insulating substrate 210 made of a material such as transparent glass or plastic. Transverse lines 220 substantially face image scanning lines 121a and storage electrode lines 131. Each transverse line 220 includes a plurality of projections projecting toward image data lines 171a and first output electrodes 175a. Transverse lines 220 prevent light leakage of portions that are not blocked by the light blocking portions 138 of storage electrode lines 131, the light blocking member islands 139, the second and third control electrodes 124b and 124c, the expansions 178a-178b, and first and second longitudinal lines 194 and 195, and thereby prevent light leakage with them.

An LCD according to the prior art includes a black matrix for preventing light leakage. The black matrix extends in the transverse and longitudinal directions and is provided on the common electrode panel 200.

For decreasing alignment error between the TFT panel 100 and the common electrode panel 200, the width of the black matrix is required to become wider, and thereby the aperture ratio decreases. However, by using the transverse lines 220, the reduction of the aperture ratio as well as light leakage are prevented.

A plurality of color filters 231-233 are also formed on the substrate 210 and the transverse lines 220 and they are disposed on portions substantially facing pixel electrodes 191. The color filters 231-233 represent one of primary colors such as red, green, and blue, respectively. Color filters 231-233 overlap each other on portions where one image data line 171a is disposed between the adjacent pixel electrodes 191. However, color filters 231-233 are separated from each other on portions where two image data lines are disposed between the adjacent pixel electrodes 191 and sensor data lines 171b and the input voltage lines 172 are disposed.

A common electrode 270 is formed on color filters 231-233 and the transverse lines 220. The common electrode 270 is preferably made of a transparent conductive material such as ITO and IZO. One or more polarizers (not shown) are provided on outer surfaces of one of the panels 100 and 200.

As a display device according to an embodiment of the present invention, an LCD is described, but many of the above-described features of the present invention may be appropriated to flat display devices such as plasma display devices (PDPs) and organic light emitting displays (OLEDs).

According to the present invention, sensing units are disposed between pixels and transverse lines for blocking light are formed instead of a black matrix, and thereby a transmissive region of a pixel increases to improve transmission of a pixel. Furthermore, it is possible to enlarge a channel width of a semiconductor of the sensing unit in a longitudinal direction, to increase a magnitude of a sensing data signal. Moreover, an image data line and a sensor data line are disposed as far as possible apart, to decrease interference between an image data signal and a sensor data signal. Accordingly to the present invention, the variable capacitors and the reference capacitors are integrated with the LC panel assembly to detect whether and where a touch occurs.

While the present teachings have been provided with reference to certain detailed embodiments, it is to be understood that various modifications and equivalent arrangements will be apparent to those skilled in the art in light of the present teachings without, however, departing from the spirit and scope of the present disclosure.

What is claimed is:

1. A liquid crystal display comprising:
   a display panel;
   a plurality of pixels formed on the display panel, including a first pixel and a second pixel, each pixel including a switching element and a pixel-electrode, each pixel having a left side and a right side, wherein the corresponding switching element of a given pixel is located either closer to the left side or closer to the right side of its respective pixel;
   a sensing unit disposed so as to be sandwiched between the first pixel and the second pixel and structured for generating a sensor data signal based on a localized touch to, or on a localized light change imposed on the display panel; and
   a plurality of image data lines each directly connected to corresponding ones of the switching elements of corresponding ones of the pixels, the data lines transmitting corresponding image data signals and comprising a first image data line directly connected to the first pixel and a second image data line directly connected to the second pixel,
   wherein the first pixel is disposed on the left side of the sensing unit, the second pixel is disposed on the right side of the sensing unit, the first image data line is disposed on the left side of the first pixel, the second image data line is disposed on the right side of the second pixel, the switching element of the first pixel is located closer to the left side of its pixel and the switching element of the second pixel is located closer to the right side of its pixel.

2. The display of claim 1, wherein the first and second pixels are substantially mirror symmetrical with respect to the interposed sensing unit.

3. The display of claim 1, further comprising an input voltage line disposed between the first and second pixels and transmitting a sensor input voltage to the sensing unit.

4. The display of claim 1, wherein the pixels further comprise a third pixel disposed on the left side of the first pixel, and the image data lines further comprise a third image data line connected to the third pixel and disposed on either one of the left and right sides of the third pixel.

5. The display of claim 4, wherein the pixels further comprise a fourth pixel disposed on the right side of the second pixel, and the image data lines further comprise a fourth image data line connected to the fourth pixel and disposed on either one of the left and right sides of the fourth pixel.

6. The display of claim 4, further comprising a sensor scanning line connected to the sensing unit to transmit a sensor scanning signal, and intersecting the pixels.

7. The display of claim 1, wherein the sensing unit comprises a sensing element sensing variation of light that is incident from the outside in accordance with the touch to generate the sensor data signal.

8. The display of claim 7, wherein the sensing unit further comprises a switching element outputting the sensor data signal to a sensor data line.

9. The display of claim 1, wherein the sensing unit comprises a sensing element sensing variation of pressure in accordance with the touch to generate the sensor data signal.

10. The display device of claim 1, further comprising a sensor data line connected to the sensing unit to transmit the sensor data signal and disposed between the first and second pixels.

11. A display device comprising:
a first panel,
a second panel facing the first panel;
an image scanning line formed on the second panel;
first and second image data lines formed on the second panel and intersecting the image scanning line;
first and second thin film transistors (TFTs) directly connected to the first and second image data lines, respectively;
first and second pixel electrodes connected to the first and second TFTs, respectively, each of the first and second pixel electrodes having an asymmetric structure allowing for disposition of the respective first or second TFT immediately adjacent to that pixel electrode;
a sensor scanning line formed on the second panel;
a sensor data line formed on the second panel and intersecting the sensor scanning line; and
a third TFT directly connected to the sensor scanning line and the sensor data line,
wherein the first and second pixel electrodes are respectively arranged on the left and right sides of the third TFT so as to thereby sandwich the third TFT between them and so as to have bilateral symmetry with respect to the so-sandwiched third TFT, and wherein the first and second image data lines are formed on the left side of the first electrode and on the right side of the second pixel electrode, respectively.

12. The device of claim 11, wherein the sensor data line is formed between the first and second pixel electrodes.

13. The device of claim 11, further comprising a light blocking member formed under the first and second image data lines.

14. The device of claim 11, further comprising a light blocking member formed on at least one of the first and second image data lines.

15. The device of claim 14, wherein the light blocking member is formed at the same layer as the first and second pixel electrodes.

16. The device of claim 11, further comprising a light blocking member formed on the sensor data line.

17. The device of claim 16, wherein the light blocking member is formed on the same layer as the first and second pixel electrodes.

18. The device of claim 11, wherein the first and second image data lines each comprise a plurality of expansions intersecting the image scanning line and the sensor scanning line.

19. The device of claim 11, wherein the sensor data line comprises a plurality of expansions intersecting the image scanning line and the sensor scanning line.

20. The device of claim 11, further comprising:
a control voltage line formed on the second panel,
an input voltage line formed on the second panel; and
a fourth TFT connected to the control voltage line, the input voltage line, and the third TFT,
wherein the input voltage line and the fourth TFT are formed between the first and second pixel electrodes.

21. The device of claim 20, further comprising a light blocking member formed on the sensor data line and the input voltage line, and covering the third TFT and not the fourth TFT.

22. The device of claim 11, further comprising a light blocking member formed on the first panel and extending in parallel to the image scamming lines.

* * * * *